United States Patent
Hoshino et al.

(10) Patent No.: US 6,506,317 B1
(45) Date of Patent: *Jan. 14, 2003

(54) COOLING MEDIUM FOR OPTICAL EQUIPMENT AND COOLING DEVICE USING THE SAME

(75) Inventors: Hiroyuki Hoshino, Kawasaki (JP); Takashi Kiyota, Yokohama (JP)

(73) Assignees: Nippon Petrochemicals Company, Limited, Tokyo (JP); San-Petrochemicals Co., Ltd., Ibaraki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/579,049

(22) Filed: May 26, 2000

(30) Foreign Application Priority Data

May 31, 1999 (JP) ............................................. 11-151309

(51) Int. Cl.$^7$ .............................. C09K 5/00; H04N 5/74
(52) U.S. Cl. .................... 252/67; 165/104.11; 348/749; 348/776; 348/805; 348/748
(58) Field of Search ...................... 585/21, 22; 252/67; 165/104.11; 348/748, 749, 776, 805

(56) References Cited

U.S. PATENT DOCUMENTS 6,115,081 A * 9/2000 Hirata et al.

FOREIGN PATENT DOCUMENTS

| EP | 226404 | * | 6/1987 |
| EP | 235720 A2 | * | 9/1987 |
| JP | 09176624 | | 7/1997 |
| JP | 09286977 | | 11/1997 |

* cited by examiner

*Primary Examiner*—Margaret Einsmann
(74) *Attorney, Agent, or Firm*—Hollander Law Firm, P.L.C.

(57) ABSTRACT

A cooling medium and a cooling device for optical equipment using the same, which cooling medium has a refractive index in a specific range, hardly causes the problem to dissolve or swell plastic lens and other component parts, and is flame retardant. The cooling medium comprises a cyclic aliphatic hydrocarbon having at least one cross linkage and has a flash point of 120° C. or above and a melting point of −20° C. or below. The space between a pair of transparent optical members of a cooling device for optical equipment, is filled with the cooling medium.

7 Claims, No Drawings

COOLING MEDIUM FOR OPTICAL EQUIPMENT AND COOLING DEVICE USING THE SAME

BACKGROUND OF THE INVENTION

1. Field of the Invention

This invention relates to a novel cooling medium and a cooling device using the same that is used mainly for the purpose of cooling the projector-type cathode-ray tube in a projector television.

2. Description of the Prior Art

The optical equipment utilizing electron beams generally accompanied by heat generation and the performance of optical equipment is often adversely influenced by the generated heat. The heat generation in the projector-type cathode-ray tube of projector television is very serious, so that its influences must be brought under deliberation.

That is, in the projector-type cathode-ray tube of projector television, highly bright optical images can be obtained by intensifying the energy of electron beams applied to a fluorescent substance. The high energy electron beams inevitably produce Joule heat simultaneously with the conversion into light. The thermal conductivity of front glass panel that is coated with a fluorescent substance, is low. Because the release of heat is not so large in the middle part of panel, the temperature rise in that part is especially serious. Therefore, the phenomenon called thermal extinction is caused to occur to reducing the luminous intensity of fluorescent substance. To avoid this, cooling operation using a cooling medium is often carried out.

The cooling medium for a projector-type cathode-ray tube of projector television is sealed into the space between glass-made cathode-ray tube and a plate or a lens made of glass or plastic. This cooling medium is generally circulated by natural convection.

Accordingly, in order to allow this natural convection to proceed smoothly within a fluid-tight space, it is important that the cooling medium is low in viscosity.

Furthermore, in order to project clearly the image formed on a fluorescent surface of a cathode-ray tube to a screen without the loss of picture quality, it is also important that cathode-ray tube, cooling medium and lens do not absorb visible light rays (wave length: 400 to 700 nm) that pass through them and that refractive indexes of all the three materials are close to one another. If the difference in refractive indexes is large, multiple reflection is caused by the difference of refractive indexes at the boundary surface, which causes the deterioration of projected images.

Therefore, in order to obtain satisfactory images, the refractive index of cooling medium is required to be in the range between the refractive index of glass and that of plastic materials.

As the plastic materials, the following ones are preferably used. Polymeric materials of PMMA (polymethyl methacrylate), PC (polycarbonate), PS (polystyrene), CR-39 (diethylene glycol bisallylcarbonate), AS (acrylonitrile-styrene copolymer), MS (methyl methacrylate-styrene copolymer) and TPX (poly(4-methylpentene-1)) are generally used.

Among them, the most preferable material is PMMA, especially the copolymer of methyl methacrylate with a comonomer such as α-methylstyrene, maleic anhydride or its imide, or an alicyclic methacrylic ester is desirable because it is excellent in thermal stability and is most suitable for making projection lenses. The refractive index of this thermal-resistant PMMA is 1.51.

Meanwhile, concerning optical glass materials, various materials having refractive indexes of 1.47 to 1.95 are used for various parts. Among them, borosilicate crown grass having them, borosilicate crown glass having the highest transmittance is used typically for lenses, which has a refractive index of 1.52.

For the above reasons, the refractive index of a cooling a medium used for projector-type cathode-ray tube of projector television is desirably in the range of 1.51 to 1.52.

Among the compounds used as the cooling medium, the refractive indexes of aliphatic hydrocarbons are considerably lower than the refractive index of 1.51 to 1.52 that is required of the cooling medium.

For raising the value of refractive index of aliphatic hydrocarbon, it is considered to introduce a cyclic moiety of alicyclic structure or aromatic structure or double bond into the compound. However, the mere introduction of a cyclic structure is insufficient in order to raise the refractive index. In addition, it causes the increase in the number of carbon atoms and increased viscosity of the cooling medium, which lowers the cooling effect under natural convection. Accordingly, the cooling medium treated with such a measure is not suitable. Meanwhile, if a double bond or an aromatic structure is introduced into a compound, the solvent power of the compound is increased and it becomes liable to dissolve plastic materials, so that the reaction product is not suitable either as a cooling medium.

In the conventional art, as the cooling oil used for a cooling device of projector-type cathode-ray tube, a compound having at least two carbon rings and a degree of aromaticity of 30% or less is proposed in Japanese Laid-Open Patent Publication No. Hei 9-176624. There is also proposed that the degree of aromaticity is lowered in order to reduce solvent power in Japanese Laid-Open Patent Publication No. Hei 9-286977. However, as described above, the compound having an aromatic ring is high in solvent power, so that problems are caused in that it dissolves or swells plastic lenses and other parts. Furthermore, in order to lower the degree of aromaticity, the introduction of an alicyclic structure is generally required. However, the lowering of refractive index is caused and the difference in refractive indexes between the cooling medium and glass or plastic material becomes large, so that the quality of the image is impaired.

Furthermore, as described in the foregoing passages, the projection-type cathode-ray tube is designed to produce optical images of high luminance by enhancing the energy of electron beams. In the case that it is not cooled in practical operation, the glass-made front panel that is coated with a fluorescent substance is heated to temperatures as high as 120° C. Therefore, in view of safety, the cooling medium must be high in boiling points, with a flash point of 120° C. or above, and is preferably fire retardant.

As described above, the problem to be solved by this invention is to propose a cooling medium and a cooling device for optical equipment using the same. The cooling medium must have a suitable refractive index, be free from the problem of dissolving or swelling plastic lens and other machine parts, have a flash point of 120° C. or above, and be preferably fire retardant.

BRIEF SUMMARY OF THE INVENTION

The present inventors have carried out extensive investigation in order to develop a cooling medium that can meet the required criteria, that is, it has a refractive index that is quite close to those of glass and plastic lenses, it neither dissolves nor swells plastic lenses, and the cooling effect thereof is high due to its low viscosity. As a result, they have found out that hydrocarbons having specific structures can attain the above objects, thereby accomplishing the present invention.

It is, therefore, the primary aspect of the present invention to provide a cooling medium for an optical equipment having a flash point of 120° C. or above and a melting point of −20° C. or below, which cooling medium comprises a cyclic aliphatic hydrocarbon having at least one cross linkage.

A second aspect of the present invention relates to a cooling medium for optical equipment as mentioned in the primary aspect, which is characterized in that the cyclic aliphatic hydrocarbon having at least one cross linkage is at least one member selected from the group consisting of compounds having 13 to 18 carbon atoms as represented by the following general formulae (I) to (IV).

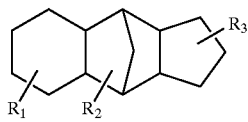
(I)

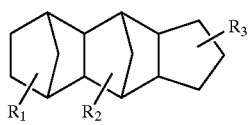
(II)

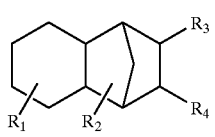
(III)

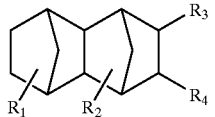
(IV)

in which each of $R_1$ to $R_3$ denotes a hydrogen atom or a methyl group, and $R_4$ denotes an alkyl group having 2 or 3 carbon atoms.

A third aspect of the present invention relates to a cooling device for optical equipment, in which the space between a pair of transparent optical elements is filled with a cooling medium having a flash point of 120° C. or above and a melting point of −20° C. or below and comprising a cyclic aliphatic hydrocarbon having at least one cross linkage.

A fourth aspect of the present invention relates to a cooling device for optical equipment as referred to in the third aspect, which is characterized in that the cyclic aliphatic hydrocarbon having at least one cross linkage is at least one member selected from the group consisting of compounds having 13 to 18 carbon atoms as represented by the general formulae (I) to (IV) in the second aspect.

A fifth aspect of the present invention relates to a cooling device for optical equipment as referred to in the third aspect, in which the optical equipment is a projector-type cathode-ray tube.

DETAILED DESCRIPTION OF THE INVENTION

In the following, the present invention is described in more detail.

In the present invention, a cyclic aliphatic hydrocarbon having at least one, preferably one to two cross linkages, is used as a cooling medium.

The refractive index required of the cooling medium is from 1.51 to 1.52. Because the refractive index of cyclic aliphatic hydrocarbon is generally lower than this value, one or more cross linkage is necessary in order to use it as a cooling medium and the number of cross linkage is preferably 1–2.

If the number of cross linkages is too large, the refractive index is high, meanwhile the viscosity is also high because the total number of carbon atoms of a compound increases. Thus, it is not suitable as a cooling medium. Furthermore, if alkyl groups having larger number of carbon atoms are joined as side chains, the refractive index of the compound is lowered, so that the total number of carbon atoms in side chains is preferably 6 or less.

The refractive index of a compound varies according to the number of cross linkages and the total number of carbon atoms in alkyl side chains. Therefore, it is important that a plurality of components must be mixed together with selecting compounds to be mixed and their compounding ratios. In some cases, a single compound having proper number of cross linkages and total number of carbon atoms of alkyl side chains can be selected. However, it is generally difficult to meet these requirements with a single compound, so that it is preferable to use by mixing in suitable proportions of several cyclic aliphatic hydrocarbons each having at least one cross linkage. In addition, it is also possible to use it by mixing with a well known cooling medium.

A cyclic aliphatic hydrocarbon having a cross linkage or linkages and total number of carbon atoms of 13 to 18 is desirable because it has a relatively high flash point and a viscosity lower than a certain level. The compound having 12 or less carbon atoms is not preferable as the cooling medium used in the present invention because its flash point is low.

The cyclic aliphatic hydrocarbon having at least one cross linkage used as the cooling medium in the present invention is particularly represented by any one of the following general formulae (I) to (IV). It can be used singly or in combination. By using a mixture of them, it is possible to prepare without difficulty a composition of cyclic aliphatic hydrocarbons having a cross linkage or linkages and having a flash point of 120° C. or higher and a melting point of −20° C. or lower.

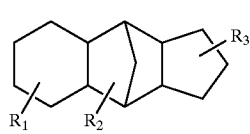
(I)

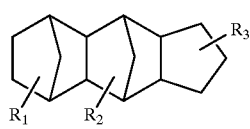
(II)

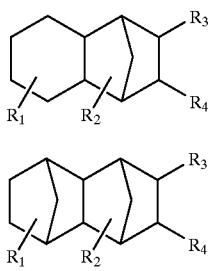

in which each of $R_1$ to $R_3$ denotes a hydrogen atom or a methyl group and $R_4$ denotes an alkyl group having 2 or 3 carbon atoms.

The compounds as represented by the general formulae (I) to (IV) can be prepared by various methods known in the prior art. The present invention, therefore, is not especially limited to such preparation methods.

It is generally exemplified by a method that an unsaturated polycyclic hydrocarbon is prepared utilizing Diels-Alder reaction (hereinafter referred to as "DA reaction") and its unsaturated bonds are converted into saturated bonds by hydrogenation. The DA reaction herein referred to means the reaction in which a compound having conjugated double bonds (conjugated diolefinic compound) is subjected to 1,4-addition to a compound having olefinic double bonds (olefinic compound) to produce cyclic olefins.

In the preparation of a hydrocarbon having cross linkage that is used in the present invention, it is possible to carry out the DA reaction of cyclopentadiene (CPD) and/or methyl-cyclopentadiene (MCPD) with an unsaturated hydrocarbon chain molecule having 4 or 5 carbon atoms. That is, 1,3-butadiene, isoprene, 1,3-pentadiene, cyclopentadiene and methyl-cyclopentadiene are used as the conjugated diolefinic compounds and the olefinic compounds. Furthermore, as the olefinic compounds, it is also possible to use 1-butene, 2-methyl-1-butene, 3-methyl-1-butene, 1-pentene, cyclopentene, and methyl-cyclopentene. However, because the reactivity of these olefinic compounds with the conjugated diolefins is not so high, somewhat more severe reaction conditions are required.

The molar ratio of conjugated diolefinic compound to olefinic compound can be arbitrarily selected because the DA reaction proceeds thermally. However, the preferable value is generally in the range of 1:10 to 10:1. It is more preferable to determine the ratios of them economically in view of their reaction rate constants at respective reaction temperatures. In the reaction, it is possible to use inert solvents such as n-heptane, benzene and toluene, alcohols such as methanol and ethanol, and other organic halides such as chlorobenzene and dichloroethane. However, these solvents are not always necessary. In other words, conjugated diolefin and olefinic compound can be caused to react without any solvent.

The reaction temperature is selected from the range of room temperature to 250° C. in accordance with reactivity of reactants. It is preferable that the reaction is carried out under the pressure in which the reaction system is maintained in liquid state at the temperature. The duration of reaction may be determined according to the reactivity of used reactants.

In the following, the DA reaction using 1,3-butadiene (BD) and cyclopentadiene (CPD) will be described in detail. It should be noted, however, that the present invention is by no means limited by this example.

By the way, CPD dimerizes readily at ordinary temperatures to produce dicyclopentadiene (DCPD), so that it is usually stored in the form of DCPD and it is used by thermal cracking as occasion demands. Also in the preparation of the compound of the present invention, besides the use of CPD as a starting material, it is also possible to use DCPD as a starting material and obtain CPD in a reaction system by thermal cracking of DCPD.

When BD and CPD are fed into a reaction vessel and they are heated with stirring, the DA reaction between BD and CPD is caused to form dimers such as 4-vinyl-1-cyclohexene (VCH), 5-vinylbicyclo[2.2.1]hept-2-ene (VBH), 3a.4.7.7a-tetrahydroindene (THI) and DCPD.

Because these compounds are also olefinic compounds, they react with BD and CPD to produce trimers. As will be understood in view of the above description, when BD and CPD are used as units, respectively, the trimers are represented by BD-CPD-BD, CPD-CPD-BD, BD-CPD-CPD, and CPD-CPD-CPD.

Furthermore, these trimers are also olefinic compounds, tetramers are produced by the addition of BD or CPD to these compounds through the DA reaction. Therefore, tetramer or higher oligomers are simultaneously produced. However, it is possible to regulate the quantity of them by selecting the reaction temperature and the reaction time. It is generally preferable that the formation of tetramer and higher oligomers are possibly suppressed.

The reaction can be done by any of batch system in which whole reactants are fed into a reaction vessel, semi-batch system in which reactants are supplemented intermittently and continuous system in which pre-determined amounts of reactants are continuously fed while reaction product is continuously taken out. Because the reaction is exothermic, after the temperature is raised to the reaction temperature, the heat of reaction is eliminated by a suitable cooling method to maintain the reaction system at a specific temperature. Because the above reactants and reaction products are liable to polymerize at the reaction temperature, it is preferable to carry out the reaction with adding 50 to 500 ppm of polymerization inhibitor such as p-phenylenediamine compound in order to avoid the occurrence of blocking in the reaction vessel and its accessories and also to avoid the problem of fouling due to the deposition of polymerization product.

In the process to prepare 5-ethylidenebicyclo[2.2.1]hept-2-ene, the DA reaction of BD with CPD is firstly done in order to produce an intermediate product of VBH. In this process, the same reaction as the foregoing one of the present invention occurs, so that the cyclic aliphatic hydrocarbon used in the present invention is produced as a by-product. It is also possible that the trimer portion is separated from the by-product fraction and hydrogenation as described below is carried out to obtain an intended product. This method is economically advantageous.

Hydrogenation is carried out in order to eliminate the unsaturated carbon-carbon bonds in the trimers or the reaction product containing trimers obtained by the above method.

Pre-treatment and after-treatment can also be done before and after the hydrogenation. In other words, it is desirable if a certain fraction is separated by distillation before the hydrogenation, because the substance that impairs catalytic activity can be eliminated and, at the same time, the loss of hydrogen due to the hydrogenation of unnecessary components can be avoided. In this treatment, because the thermal stability of the above mixture of reactants is inferior, thermal decomposition and thermal transformation are liable to occur. Therefore, the distillation is preferably done under a reduced pressure with the bottom temperature of 170° C. or below, preferably 150° C. or below.

After obtaining a fraction of intended trimer by reduced pressure distillation, the hydrogenation of this fraction is done. Although a solvent may be used for the reaction, it is not necessary in usual cases. The hydrogenation is carried out under hydrogen pressure of normal to 350 kg/cm², at a temperature in the range of room temperature to 300° C. in the presence of a catalyst of a metal such as nickel, palladium, platinum, cobalt, or rhodium, or oxides of these metals. The hydrogenation can be done in either a batch-wise system or continuous system.

After the reaction, after-treatment is done as occasion demands, and distillation may be done for the purpose of adjusting the composition of reaction product so as to obtain the intended compounds.

The cooling medium according to the present invention is used for cooling cathode-ray tubes, especially projector-type cathode-ray tubes. More particularly, it is used for the purpose to avoid the local heating of front glass panel that is coated with a fluorescent substance. As the method for cooling, it is possible to utilize forced convection with an optional circulating mechanism, however, the circulation is generally done by natural convection utilizing the difference in specific gravity caused by the temperature difference of cooling medium.

In order to cool a heated portion effectively, the amount of circulation of cooling medium must be increased. For the purpose of increasing the amount of circulation of cooling medium in natural convection system, it is effective to use such a cooling medium that the friction with wall surfaces of container is small and internal friction of the fluid itself is also small. In other words, the use of a low viscosity medium is effective.

In view of the following Equation (1) of Poiseuille's law, when forced circulation is done, the flow rate of fluid through piping is in inverse proportion to its viscosity. That is, if other conditions are identical, the flow rate can be increased by lowering the viscosity of a fluid. Furthermore, when a cooling medium is supplied at a constant flow rate, the smaller the viscosity of cooling medium, the smaller the value Δp. So that the total size of equipment can be reduced because pumps of small capacity can be used.

$$Q=[\pi R^4/8(v\cdot\rho)]\times(\Delta p/L) \quad \text{Equation (1)}$$

wherein

Q [mm³/s]: flow rate of liquid

R [mm]: radius of cylindrical tube v[mm²/s]: kinematic viscosity of liquid

ρ[g/mm³]: density of liquid

Δp [g/(mm·s²)] pressure difference between both ends of cylindrical tube

L [mm] length of cylindrical tube

EXAMPLES

The present invention will be described in more detail.

Test methods for cooling mediums are as follows:

<Immersion Test>

(a) Immersed Members (1) Plastic Material: PMMA (Polymethyl methacrylate)

Average molecular weight: ca. 1,000,000

Refractive index: 1.49

Size of test piece 25 mm×100 mm×2 mm (2) Glass: Borosilicate glass

Size of test piece 25 mm×100 mm×2 mm (b) Immersion Conditions

Duration: 96 hours

Temperature: 80° C.

(c) Method of Judgement

Changes in the surfaces of immersed test pieces were observed by naked eyes and judged according to the following standards.

No change: ○, Change occurred: ×

<Transmittance>

Spectrophotometer: Ubest-50, made by JASCO Corp.

Wave length: Visible range 400 to 700 nm

Reference: Pure water

The standards for judgement were as follows:

100 or above in transmittance: ⊚

98 or above, below 100: ○

Below 98: ×

Example 1

To a reaction vessel were fed 4,052 g of CPD (cyclopentadiene) and 5,951 g of BD (1,3-butadiene) and reaction was carried out for 5 hours at 140° C. The reaction product was subjected to distillation to remove unreacted materials and formed dimers. The dimer having a highest boiling point was DCPD, the boiling point of which was 105.3° C. at 100 mm Hg abs.

After removing dimers, a trimer fraction was distilled off (10 mm Hg abs., 111–138° C.) to obtain refined trimers. To 100 parts by weight of this trimer fraction, 2 parts by weight of powdery nickel catalyst N113 (trade name, made by Nikki Chemical Corp.) was added and hydrogenation was carried out at reaction temperature of 120° C. for 5.5 hours under a hydrogen pressure of 70 kg/cm²G.

After the reaction, the catalyst was removed by filtration, which was followed by distillation for refining to obtain an intended fraction. Its boiling range was the same as that before the hydrogenation. This fraction was used for the following examples. The fraction was composed of the following components A, B, C and D.

Component A: Hydrogenation product of the adduct of 2 molecules of BD and 1 molecule of CPD (about 20%).

Component B: Hydrogenation product of the adduct of 1 molecule of BD and 2 molecules of CPD (about 20%).

Component C: Hydrogenation product of the adduct of 1 molecule of BD and 2 molecules of CPD (about 30%).

Component D: Hydrogenation product of the adduct of 3 molecules of CPD (about 30%).

The immersion test results for test pieces are shown in Table 1, physical properties of cooling mediums are shown in Table 2 and results of transmittance cooling mediums are shown in Table 3, respectively. The chemical structures of the foregoing components A, B, C and D are shown in the following.

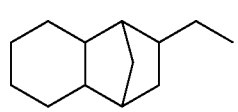

Component A

-continued

Component B

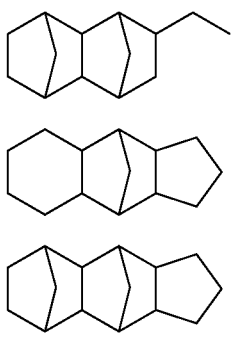

Component C

Component D

Comparative Examples 1 and 2

A mixture of xylene compounds was alkylated with styrene and a fraction of 290 to 305° C. (at normal pressure) was recovered from the liquid-reaction product. The recovered fraction was mainly composed of diaryl alkane.

In the next step, this fraction was subjected to hydrogenation of aromatic rings using a nickel catalyst supported on diatomaceous earth. Tests were done in the like manner as in Example, where only one ring was partially hydrogenated in Comparative Example 1 and both the two rings were hydrogenated in Comparative Example 2. The results are shown in Tables 1 to 3.

The composition in Comparative Example 2 was as follows:

1- Cyclohexyl-1-dimethylcyclohexylethane: 75%

1-Cyclohexyl-1-ethylcyclohexylethane: 19%

Two ring hydrogenation product of styrene dimer: 6%

TABLE 1

Results of Immersion of Test Pieces

|  | Example 1 | Comp. Example 1 | Comp. Example 2 |
|---|---|---|---|
| Plastics | ○ | x | ○ |
| Glass | ○ | ○ | ○ |

As a result of observation after the immersion of test pieces, it was noted that the surface of plastic material in Comparative Example 1 was dissolved, which were immersed in the mixture containing aromatic ring. No change was observed in the surfaces of plastic and glass materials that were immersed in the mixture of Example 1.

TABLE 2

Physical Properties of Cooling Mediums

|  |  | Example 1 | Comp. Exam. 1 | Comp. Exam. 2 |
|---|---|---|---|---|
| Refractive Index [@25° C.] | | 1.51 | 1.52 | 1.48 |
| Kinematic | @40° C. | 6.7 | 8.7 | 8.1 |
| Viscosity (mm²/s) | @25° C. | 11.2 | 15.4 | 14.1 |

TABLE 3

Transmittance of Cooling Mediums

|  |  | Example 1 | Comp. Exam. 1 | Comp. Exam. 2 |
|---|---|---|---|---|
| Wave Length (nm) | 700 | ⊙ | ⊙ | ⊙ |
|  | 620 | ⊙ | ⊙ | ⊙ |
|  | 550 | ⊙ | ⊙ | ⊙ |
|  | 500 | ⊙ | ⊙ | ⊙ |
|  | 400 | ⊙ | ⊙ | ⊙ |

As shown in Table 2, the refractive index in Example 1 is 1.51, which is the same as the refractive index of modified heat resistant PMMA used widely for plastic lenses. In view of this fact, it is understood that multiple reflection can be suppressed and clear picture quality can be realized when the mixture of Example 1 is used as a cooling medium.

Furthermore, the mixture used in Example 1 is low in viscosity as compared with those in Comparative Examples 1 and 2, more effective circulation can be attained in the cooling under natural convection. Accordingly, although the cooling in the central region of a panel is difficult, effective cooling can be done also in that region and the occurrence of the phenomenon of thermal extinction can be avoided.

Furthermore, because the flow resistance can be reduced when a cooling medium of low viscosity is used, it is possible to use smaller circulation pumps in forced circulation system. In the case of natural convection, it is also possible to reduce the size of equipment because the thickness of cooling layer can be made smaller. In addition, by reducing the thickness of cooling layer, clearer images can be produced because the absorption of light rays is reduced.

Still further, in the operation of a projector-type television, the front glass panel that is applied with fluorescent substance reaches a temperature as high as 120° C. when cooling is not done, however, the mixture in Example of the present invention has a flash point that is higher than the above temperature, so that is suitable as a cooling medium.

The cooling medium used in the present invention consists of cyclic aliphatic hydrocarbon having cross linkage or linkages, so that the value of its refractive index is between those of glass and plastic lens. Therefore, by using the cooling medium of the present invention, clearer picture images can be produced as compared with those in the use of a conventional cooling medium. Furthermore, because the viscosity of cooling medium of the present invention is very low as compared with those of simple cyclic hydrocarbons and aromatic hydrocarbons having no cross linkage, sufficient cooling effect can be attained even in the cooling under natural convection and the phenomenon of thermal extinction can be avoided to enhance the clarity of picture images. In addition, because the cooling medium of the present invention is safe owing to its higher flash point, it is most suitable for use in the cooling devices for projector-type cathode-ray tubes.

In the following, the characteristic features of the cooling medium used in the present invention are enumerated.

(a) The value of refractive index is in the range between those of glass and plastic lens as optical elements that are used in contact with cooling mediums.

(b) The light transmittance is quite good.

(c) The circulation can be done smoothly because of low viscosity.

(d) The flash point is high.

(e) The boiling point is high.

(f) It causes neither corrosion nor dissolution of component parts of equipment.

(g) When the cooling medium is a mixture, it is more desirable because the melting point of the mixture is low to maintain itself in a liquid phase.

What is claimed is:

1. A cooling device for optical equipment comprising a pair of transparent optical elements separated by a space which is filled with a cooling medium having a flash point of 120° C. or above and a melting point of −20° C. or below and comprising a cyclic aliphatic hydrocarbon having at least one cross linkage.

2. A cooling device for optical equipment as claimed in claim 1, wherein said cyclic aliphatic hydrocarbon having at least one cross linkage is at least one member selected from the group consisting of compounds having 13 to 18 carbon atoms as represented by the general formulae (I) to (IV):

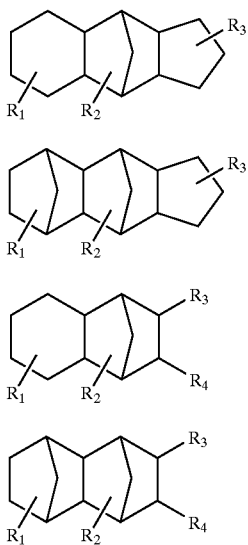

in which each of $R_1$ to $R_3$ denotes a hydrogen atom or a methyl group and $R_4$ denotes an alkyl group having 2 or 3 carbon atoms.

3. A cooling device for optical equipment as claimed in claim 1, wherein said optical equipment is a projector-type cathode-ray tube.

4. A method of cooling optical equipment having a cooling medium contained therein comprising circulating said cooling medium within said optical equipment, wherein the cooling medium has a flash point of 120° C. or above and a melting point of −20° C. or below and comprises a cyclic aliphatic hydrocarbon having at least one cross linkage.

5. A method of cooling optical equipment as claimed in claim 4, wherein said cyclic aliphatic hydrocarbon having at least one cross linkage is at least one member selected from the group consisting of compounds having 13 to 18 carbon atoms as represented by the following general formulae (I) to (IV):

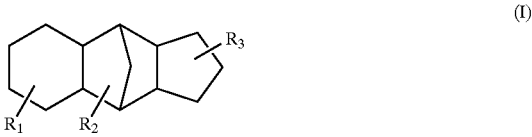

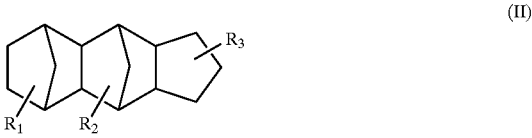

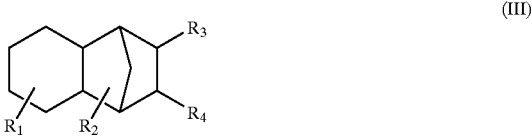

in which each of $R_1$ to $R_3$ denotes a hydrogen atom or a methyl group and $R_4$ denotes an alkyl group having 2 or 3 carbon atoms.

6. A method of cooling optical equipment as claimed in claim 4, wherein said optical equipment is a projector-type cathode-ray tube.

7. A method of cooling optical equipment as claimed in claim 4, wherein said circulating results from natural convection utilizing a local difference in the specific gravity of said cooling medium caused by a local temperature difference in said cooling medium.

* * * * *